(12) United States Patent
Nagasawa (10) Patent No.: US 6,591,057 B2
(45) Date of Patent: Jul. 8, 2003

(54) EDITING DEVICE AND DATA TRANSMISSION METHOD

(75) Inventor: Fumihiro Nagasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/117,905

(22) PCT Filed: Dec. 9, 1997

(86) PCT No.: PCT/JP97/04521

§ 371 (c)(1),
(2), (4) Date: Apr. 5, 1999

(87) PCT Pub. No.: WO98/26589

PCT Pub. Date: Jun. 18, 1998

(65) Prior Publication Data

US 2003/0095787 A1 May 22, 2003

(30) Foreign Application Priority Data

Dec. 9, 1996 (JP) .............................. 8-328936

(51) Int. Cl.[7] .......................... H04N 5/93; H04N 5/781
(52) U.S. Cl. ............................ 386/52; 386/55; 386/125
(58) Field of Search .................... 386/52, 125, 126, 386/4, 1, 46, 45, 55, 92, 53, 124, 95, 105, 106, 6, 68; H04N 5/93, 5/781

(56) References Cited

U.S. PATENT DOCUMENTS 5,754,730 A * 5/1998 Windrem
5,923,384 A 7/1999 Enomoto et al.
6,115,536 A * 9/2000 Iwasaki et al.

FOREIGN PATENT DOCUMENTS

| EP | 0 268 270 | 5/1988 |
|----|-----------|--------|
| EP | 0 509 140 | 10/1992 |
| EP | 0 690 630 | 1/1996 |
| GB | 2 296 600 | 7/1996 |
| JP | 6-276479 | 9/1994 |
| JP | 8-195928 | 7/1996 |
| WO | WO 94 24633 | 10/1994 |

* cited by examiner

*Primary Examiner*—Robert Chevalier
(74) *Attorney, Agent, or Firm*—Frommer Lawrence & Haug LLP; William S. Frommer; Bruno Polito (57) ABSTRACT

Video data inputted from an input terminal 32 is equally divided and recorded on disk drives 18a to 18c, respectively. The video data recorded on the disk drives 18a to 18c is sent out to a data bus 30 at a predetermined timing in accordance with a transfer control command from a data transfer controller 22, and image-processed by a switcher/digital multi-effector 13. Plural channels of video data are laid out in plural time slots formed by dividing a transmission unit having a length equal to a period forming one horizontal line prescribed by a predetermined analog video signal standard, and each channel of video data at least for one frame is transmitted with the transmission unit having a number of lines corresponding to one frame of the analog video signal standard. Thus, a digital data transmission method which enables high-speed synchronous transfer of video data and a data editing device which enables linear editing and non-linear editing may be provided.

12 Claims, 9 Drawing Sheets

EDITING DEVICE AND DATA TRANSMISSION METHOD

TECHNICAL FIELD

This invention relates to an editing device and a data transmission method, and particularly to an editing device and a data transmission method for editing and transmitting digital video signals.

BACKGROUND ART

Videos of television broadcasting programs are normally produced by editing material data recorded on a magnetic tape. Editing work may be classified into on-line editing for, carrying out editing by using a high-definition material tape for broadcast, and off-line editing for carrying out rough editing by copying onto an editing tape. For normal editing, off-line editing using no valuable material tape is carried out.

Recently, a digital editing device based on a personal computer has been diffused as an editing device used for editing work. The digital editing device has a storage unit which uses a hard disk or the like for storing video data and enables non-linear access thereto, and a digital picture processing unit. The digital editing device is capable of carrying out editing operation at a timing independent of an external equipment after video data is transferred from a digital video tape recorder (digital VTR) to the hard disk. Since video signals are recorded on the recording medium which enables non-linear access thereto, it is not necessary to edit the video signals along the time series, and video editing may be carried out while the recording medium is randomly accessed. Such editing method is referred to as non-linear editing.

Non-linear editing is a convenient method because it is not necessary to take synchronization with an external video equipment connected to the editing device. However, in the case where edited videos of high definition are needed, it may be better to reproduce videos from a magnetic tape and edit the reproduced videos (linear editing). Therefore, a hybrid editing device which enables non-linear editing and linear editing is demanded.

However, in order to constitute a hybrid editing device, it is necessary to carry out synchronous transfer of video data between an external video equipment, such as, a VTR, connected to the editing device and a hard disk unit in the editing device. Therefore, a data transmission method which enables easy and reliable synchronous control is necessary. In addition, it is desired to carry out the synchronous transfer at a higher speed so as to make the time-consuming editing work quicker and more efficient.

In view of the foregoing status of the art, it is an object of the present invention to provide an editing device and a data transmission method for digital data which enable high-speed data transfer in synchronization with video signals from an external video equipment.

DISCLOSURE OF THE INVENTION

An editing device according to the present invention includes a format converting section for converting input data to internal transfer data, an internal bus to which the data outputted from the format converting section is transferred, and a data transfer control section for performing control to plurally divide a transmission unit having a length equal to a predetermined period prescribed by an analog signal, lay out the input data in each of divided areas, and transfer the transmission unit as the internal transfer data onto the internal bus in synchronization with the input data.

A data transmission method according to the present invention includes a first step of plurally dividing a transmission unit having a length equal to a predetermined period prescribed by an analog signal, a second step of laying out input data in each area divided at the first step and outputting the transmission unit as internal transfer data in synchronization with the input data, and a third step of transferring the internal transfer data outputted at the second step to an internal bus.

BEST MODE FOR CARRYING OUT THE INVENTION

A preferred embodiment of the present invention will now be described in detail with reference to the drawings. In the following description, a data editing device to which a digital data transmission method of the present invention is applied is first explained, and then, the digital data transmission method of the present invention is explained with reference to the operation of the data editing device.

Figure 1:
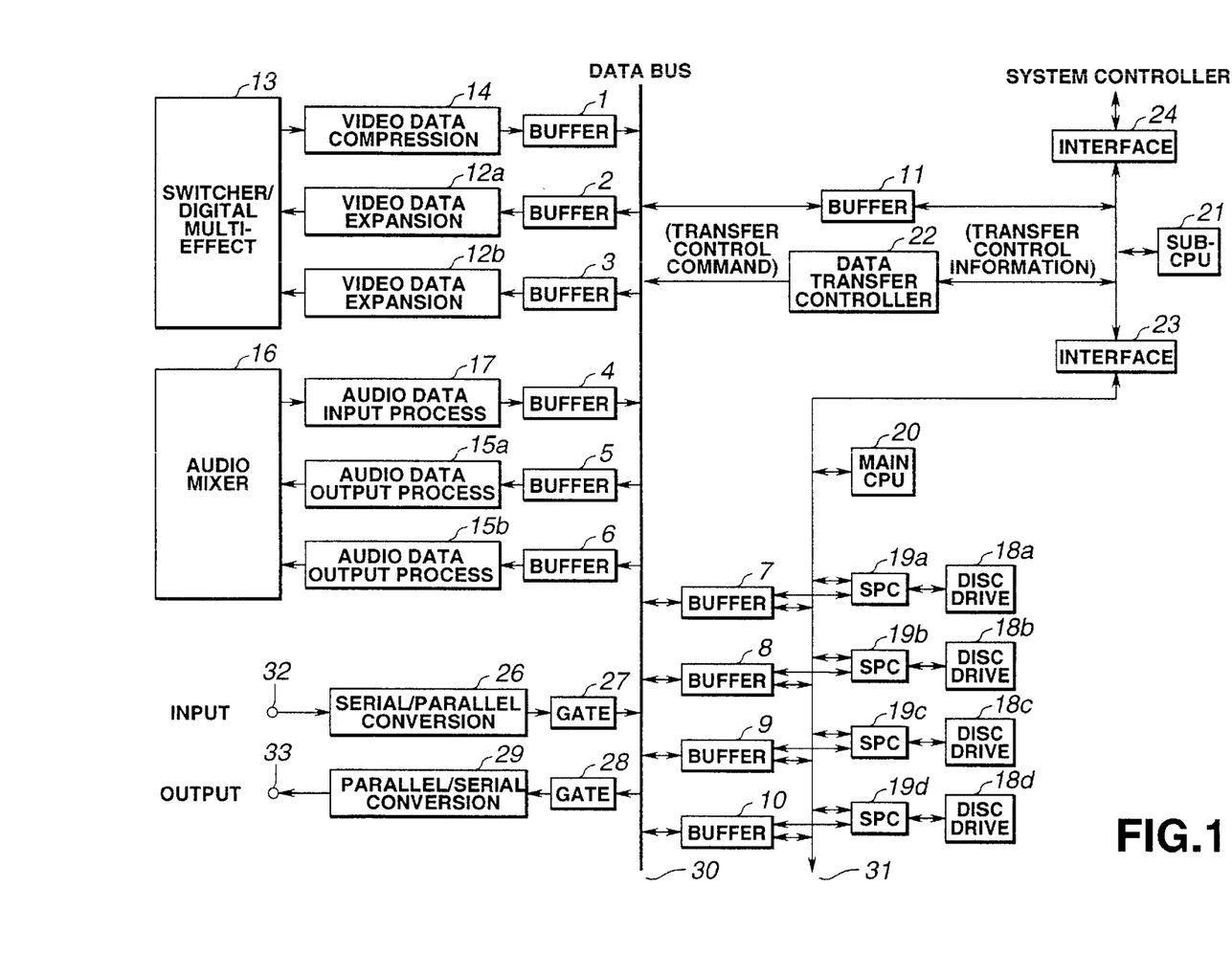
FIG. 1 is a block diagram showing an exemplary structure of main portions of a data editing device to which a digital data transmission method as an embodiment of the present invention is applied.

FIG. 1 is a block diagram showing an exemplary structure of main portions of a data editing device to which a digital data transmission method as an embodiment of the present invention is applied. This data editing device has a switcher/digital multi-effector 13, an audio mixer 16 and four disk drives 18a to 18d which are connected to a data bus 30 via buffers, respectively, and also has an input terminal 32 and an output terminal 33. The data editing device also has a main CPU 20 and a sub-CPU 21 for controlling the operation of each of the above-described parts, and a data transfer controller 22 for controlling the timing of data transfer or the like. The main CPU 20, the sub-CPU 21 and the data transfer controller 22 are connected with one another via a control bus 31.

Each part of the data editing device will now be described.

Buffers 1 to 11 are adapted for temporarily storing data which are transferred on the data bus 30, and inputting/outputting the data at a predetermined timing under the control of the data transfer controller 22. These buffers will be described later.

Video data expanding sections 12a and 12b are adapted for taking out desired compressed video data from the data bus 30 via the buffers 2 and 3, then expanding the video data, and supplying the expanded video data to the switcher/digital multi-effector 13. Since the switcher/digital multi-effector 13 switches or connects at least two image data, it is normal that at least two or more of the video data expanding sections 12 are provided.

The switcher/digital multi-effector 13 is adapted for switching plural video data outputted from the video data expanding sections 12a and 12b or providing various image special effects, as an editor operates an operating section, not shown.

A video data compressing section 14 compresses video data on which desired video processing has been performed by the switcher/digital multi-effector 13, and sends the compressed video data to the data bus 30 via the buffer 1.

Audio data output process sections 15a and 15b take out desired audio data from the data bus 30 via the buffers 5 and 6, respectively, and supply the audio data to the audio mixer 16. Since the audio mixer 16 mixes or switches at least two audio data, it is normal that at least two or more of the audio data output process sections 15 are provided.

The audio mixer 16 mixes plural audio data outputted from the audio data output process sections 15 or provides various sound effects, as the editor operates an operating section, not shown.

An audio data input process section 17 sends audio data on which various processing has been performed by the audio mixer 16 to the data bus 30 via the buffer 4.

The disk drives 18a to 18d temporarily store, onto hard disks, video data and audio data which have been inputted thereto via the data bus 30. Magnetic disk drives are typically employed.

This data editing device is capable of divisionally recording video data on two or three of the four disk drives 18a to 18d. A data dividing method in this case will be described later.

SPCs 19a to 19d are device controllers for controlling input and output of video data and audio data to be recorded on or reproduced from the disk drives 18a to 18d, and are exemplified by SCSI protocol controllers (SPCs).

The disk drives 18a to 18d are connected to the data bus 30 via the SPCs 19a to 19d and the buffers 7 to 10, respectively. The SPCs 19a to 19d and the buffers 7 to 10 are connected to the control bus 31.

The main CPU 20 and the sub-CPU 21 are adapted for controlling the operation of each part of this data editing device, and are connected to the control bus 31.

The data transfer controller 22 is connected between the data bus 30 and the control bus 31. The data transfer controller 22 generates a transfer control command based on data transfer control information from the main CPU 20 and the sub-CPU 21, and supplies the transfer control command to the data bus 30. Data to be transferred on the data bus 30 are inputted or outputted from each buffer at a predetermined timing in accordance with the transfer control command.

Interface sections 23, 24 are provided on the control bus 31 as interfaces for control data sent and received between various parts.

A serial/parallel converting section 26 converts serial data inputted from the input terminal 32 to parallel data.

A gate 27 sends the data from the serial/parallel converting section 26 to the data bus 30 at a predetermined timing.

A gate 28 supplies desired data extracted from the data bus 30 to a parallel/serial converting section 29.

The parallel/serial converting section 29 converts the data from the gate 28 to serial data, and outputs the serial data from the output terminal 33.

FIG. 2 shows a state that video data are divisionally recorded onto plural units of the four disk drives 18a to 18d of FIG. 1, and portions of slant lines correspond to actual data areas. This data layout is considered so that video data of each time slot formed by plurally dividing a transmission unit having a length equal to a period forming one horizontal line prescribed by a predetermined analog video signal standard may be easily transferred divisionally between plural hard disk drives.

Specifically, in order to facilitate address control of the above-described buffers, it is convenient that the data quantity per one horizontal period is 256 bytes. Thus, it is convenient that the read control or write control unit per one horizontal period of each buffer shown in FIG. 1 (or integer times this unit) and the data quantity per one horizontal period to cope with various buffers are set to be 256 bytes. As a matter of course, the data quantity is not limited to this value and may be any value as long as it is based on the technical idea of the present invention. The buffers used in this embodiment are general-purpose DRAMs, which will be described later.

The data quantity per one macroblock is 80 bytes and compression is carried out on the basis of five macroblocks as a unit. Therefore, the minimum data quantity of compressed video signals is 80×5=400 bytes. A compression method in this embodiment will be described later.

Thus, the data quantity per one horizontal period and the minimum data quantity of the compressed video signals have poor matching property with each other. With such poor matching property, when the compressed data are written in or read out from each buffer shown in FIG. 1, very complicated address control must be carried out in order to match the minimum data quantity of the compressed data with the data quantity per one horizontal period of write control or read control.

The data layout of FIG. 2 overcomes the above-described problem, and enables divisional transfer of video data with clear breakpoints on the data bus 30 with respect to plural disk drives, that is, two or three disk drives in this embodiment.

Numerals in FIG. 2 represent the data quantity of video data in conformity with the 525 scanning lines/60 fields system, and numerals in parentheses represent the data quantity of video data in conformity with the 625 scanning lines/50 fields system.

Figure 2A:
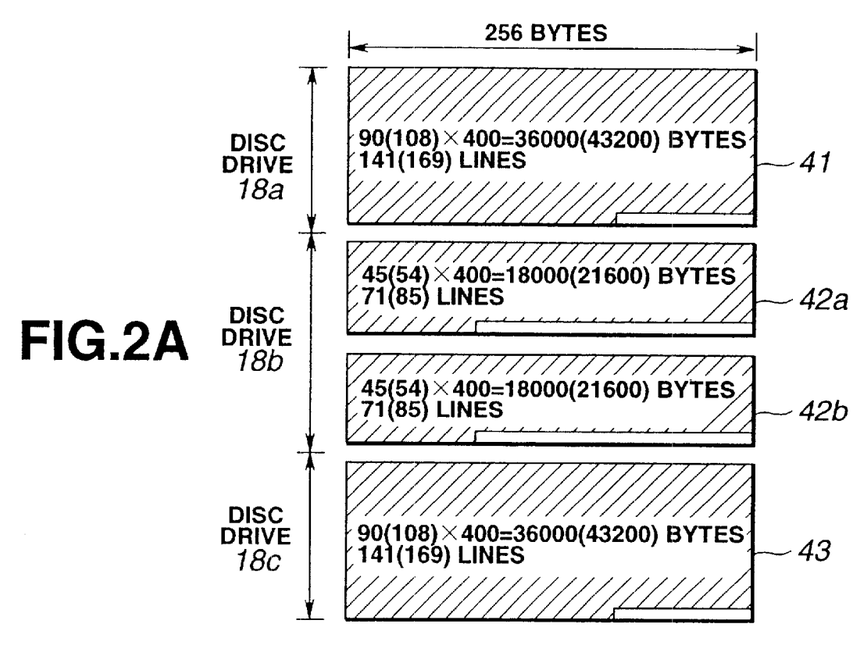
FIG. 2 is a view for illustrating a data dividing method in the case where digital video data are to be divisionally transferred to two or three disk drives.

FIG. 2(a) shows one screen (one frame) of compressed video data as a whole. As shown in FIG. 2(a), the compressed video data constituting one screen (one frame) is trisected. That is, the video data is divided into video data 41, 42a, 42b and 43. In this case, the ratio of data quantity of the compressed video data 41 and 42a, and the ratio of data quantity of the compressed video data 42b and 43 are 2:1, respectively. Specifically, with the video data of the 525 scanning lines/60 fields system, if video data in which a compression unit consists of five macroblocks as described above (hereinafter five macroblocks are referred to as one compression unit) with one frame consisting of 270 compression units (that is, one frame consists of 1350 macroblocks) is trisected, the data are equally divided for three disk drives, and therefore, data of 90 compression units is recorded on one disk drive. Since the data quantity of one compression unit is 400 bytes as described above, the quantity of the data recorded on the disk drive 18a is 90×400=36000 bytes. Similarly, the quantity of the data recorded on the disk drive 18c is 90×400=36000 bytes. The data recorded on the disk drive 18b consists of 90 compression units formed by combining the data 42a and the data 42b, each having 45 compression units. Therefore, the data quantity is 2×45×400=36000 bytes. If the data quantity of one horizontal period is 256 bytes, the number of vertical lines is 141 for the compressed data 41 recorded on the disk drive 18a, and 71 for the compressed data 42a recorded on the disk drive 18b. Similarly, the number of vertical lines is 71 for the compressed data 42b recorded on the disk drive 18b, and 141 for the compressed data 43 recorded on the disk drive 18c. Actually, though 36000÷256=140.625 lines are required in the case of the compressed data 41, 141 lines are necessary for packing all the 36000 bytes. Similarly, with respect to the compressed data 42a, though 18000÷256=70.3125 lines are required, 71 lines are necessary for packing all the data. The above-described values are in conformity with the 525 scanning lines/60 fields system, and the values in conformity with the 625 scanning lines/50 fields system are shown in parentheses in FIG. 2(a).

Figure 2B:
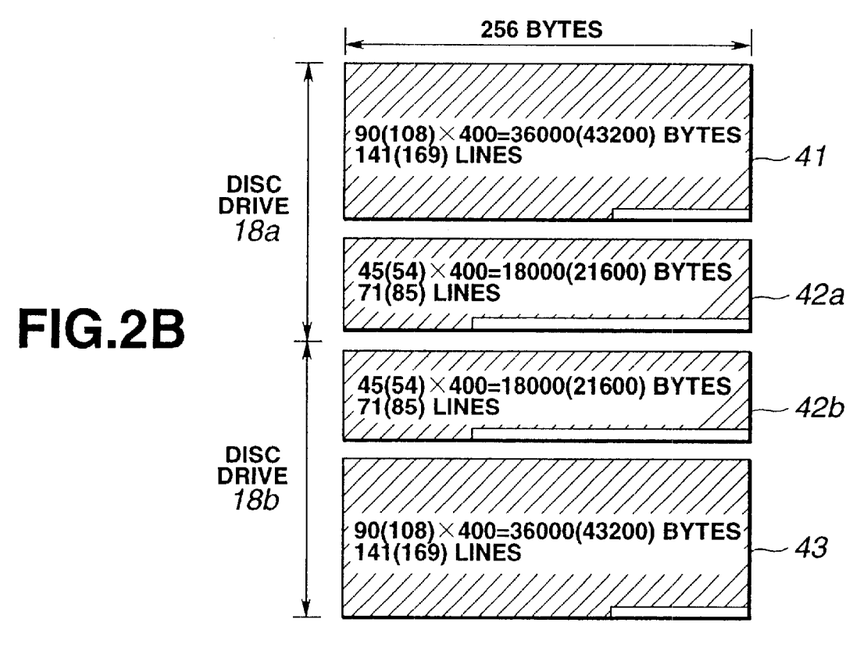

FIG. 2(b) shows one screen (one frame) of compressed video data as a whole, similarly to FIG. 2(a). However, FIG. 2(b) shows the data layout in the case where the compressed video data is divisionally recorded on the two disk drives 18a and 18b of the four disk drives shown in FIG. 1. In this case, one frame of video data is bisected as a whole. Specifically, the compressed video data 41 and 42a are recorded on the disk drive 18a, and the compressed video data 42b and 43 are recorded on the disk drive 18b. The data quantities of the compressed data 41, 42a, 42b and 43 are similar to those of FIG. 2(a).

By providing the above-described layout of the data which should be recorded on two or three disk drives, divisional transfer of the video data may be carried out with clear breakpoints. Also, by setting one horizontal period to 256 bytes, it is possible to cope with various buffers and facilitate read and write control of each buffer.

The video data is compressed by the video data compressing section 14 shown in FIG. 1, and the data layout as shown in FIG. 2 is carried out by the buffer 1 in accordance with the transfer control command from the data transfer controller 22. A data layout method including the transfer control command from the data transfer controller 22 will be described later.

The video data is band-compressed, recorded/reproduced, and transferred by the video data compressing section 14 of the data editing device. This band compression is carried out by compression coding based on DCT (discrete cosine transform) and VLC (variable length coding), and spatial redundancy and temporal redundancy are reduced by utilizing strong correlation between adjacent pixels constituting the screen. The procedure of this compression coding will now be described schematically with reference to FIG. 3.

Figure 3:
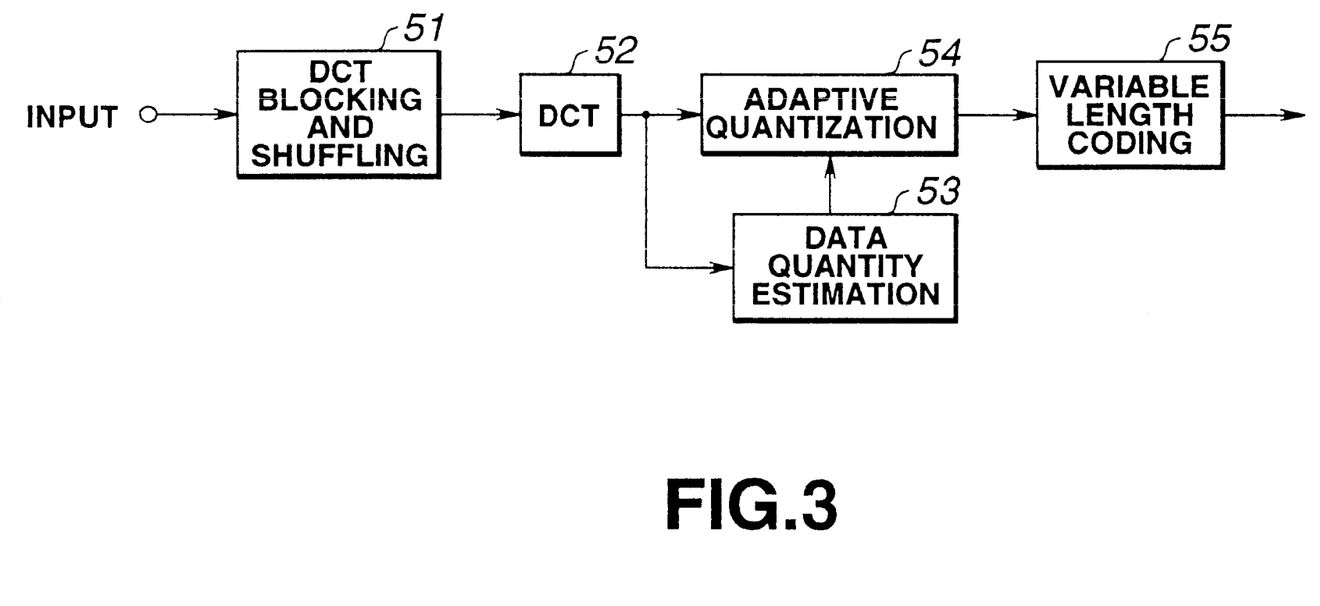
FIG. 3 is a block diagram for illustrating the procedure of compression coding of digital video signals.

The inputted video data is first blocked and shuffled by a DCT blocking and shuffling section 51. The video data for one frame is divided into (8×8) blocks as basic units for carrying out DCT so as to be blocked. This block, referred to as a macroblock, is compressed to a predetermined number of bits by discrete cosine transform as later described. Then, the macroblocks constituting respective parts of the screen are shuffled in accordance with predetermined rules, and sent to a DCT section 52 in such a manner that five macroblocks form one unit (one compression unit as described above) to provide a uniform information volume within the screen. One compression unit formed by shuffling is DCT-transformed by the DCT section 52 for every (8×8) block thereof.

The discrete cosine transform (DCT) section 52 performs discrete cosine transform, which is a kind of orthogonal transform. Through this discrete cosine transform, pixels values of the video data are made non-correlative and transformed onto the frequency axis. At this point, the macroblock has a fixed block length. The video data, having all the macroblocks transformed by discrete cosine transform, is temporarily stored in a buffer and then sent to a data quantity estimating section 53 and an adaptive quantizing section 54.

The data quantity estimating section 53 estimates the data quantity during when all the blocks which have been transformed by discrete cosine transform are stored in the buffer, and selects a quantizer for quantizing the segment of the data. Specifically, 16 types of quantizers are prepared in advance, and one quantizer having an appropriate quantizer number (Q-number) is selected from the 16 quantizers. Since variable length coding as later described only allocates a predetermined code to a resultant coefficient and cannot control the code quantity, the quantization at this point serves as code quantity control means. The result of data quantity estimation is supplied to the adaptive quantizing section 54 and thus used for adaptive quantization.

The adaptive quantizing section 54 performs adaptive quantization using different quantization steps in consideration of visual characteristics such that even rough quantization does not appear conspicuously in a portion with high precision on the screen while quantization distortion is likely to appear conspicuously in a smoothly changing portion. Such adaptive quantization is carried out by classifying blocks within the segment of the video data into four classes, and allocating different quantization steps constituting the quantizer in accordance with class numbers. Thus, bit allocation to a block with low precision is increased, thus enabling improvement in picture quality.

A variable length coding section 55 performs variable length coding based on the above-described data quantity estimation. Specifically, when a quantizer number is selected by the data quantity estimating section 53, the data segment stored in the buffer is quantized by this quantizer number and then coded by variable length coding.

This variable length coding is referred to as Huffman coding. Specifically, quantized coefficients are scanned in a zigzag manner, and codes prepared on a table are allocated to a run length of coefficients of zero and a set of values of non-zero coefficients subsequent thereto.

The format of the video data inputted and outputted from the input terminal 32 and the output terminal 33 in the data editing device will now be described with reference to FIG. 4.

This format enables transmission of original video data which is not compressed, compressed video data, audio data, and control information.

The transmission format shown in FIG. 4 is referred to as a serial digital data interface (SDDI) format, and the SDDI format shown in FIG. 1 is constituted by signals of a D-1 (component) format.

Figure 4A:
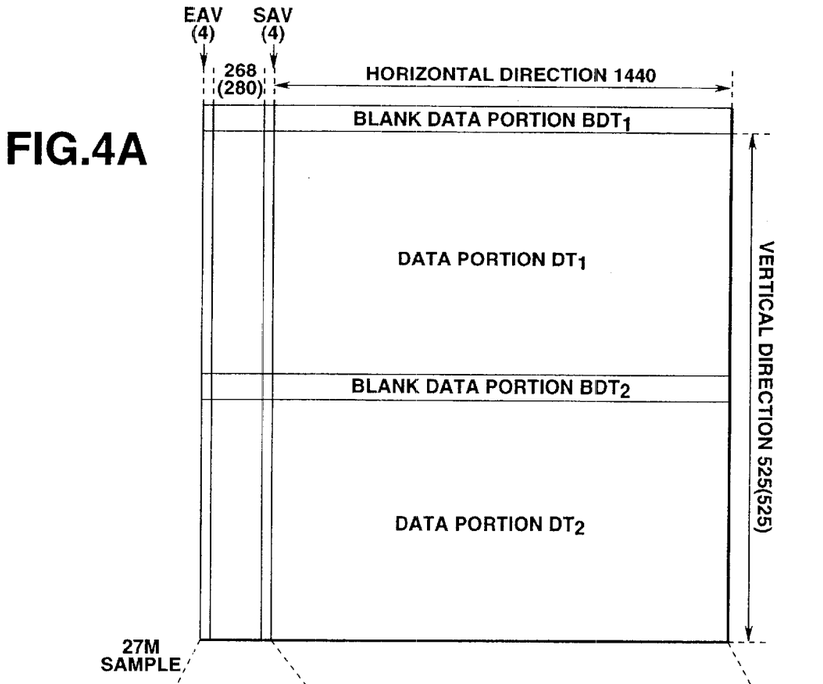
FIG. 4 is a view showing an example of the transmission format of digital video data to be transmitted.

This data format is constituted as a whole by a first data portion $DT_1$ and a second data portion $DT_2$, and a first blank data portion $BDT_1$ and a second blank data portion $BDT_2$ which are inserted before the first data portion $DT_1$ and the second data portion $DT_2$, respectively, as shown in FIG. 4(a). In the first and second data portions $DT_1$, $DT_2$ and the first and second blank data portions $BDT_1$, $BDT_2$, a four-bit start synchronizing code SAV and an end synchronizing code EAV are inserted. Between the start synchronizing code SAV and the end synchronizing code EAV, an ancillary data portion ANC which is 268-word auxiliary data is inserted.

One of the characteristics of the SDDI format is that setting of data type and line number as later described enables free changing of the kind of data, the position of data and the number of lines, for example, free switching in a vertical interval time code by a switcher or a router as a broadcasting equipment at the destination of transmission. Also, effective data to be inserted in the data portions $DT_1$, $DT_2$ may be inserted in all the intervals of the frame, and a very flexible system may be constructed by using this SDDI format in the transmission system.

Figure 4B:
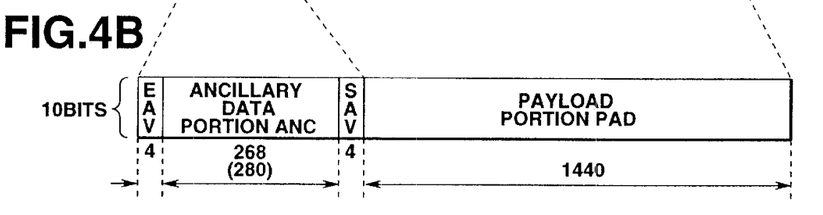

FIG. 4(b) shows a line format, that is, a horizontal format. The horizontal format is constituted by a four-word end synchronizing code EAV, a 268-word ancillary data portion ANC (268 words in the case of 525 scanning lines/60 fields system, and 280 words in the case of 625 scanning lines/50 fields system), a four-word start synchronizing code SAV, and a 1440-word payload portion PAD.

Figure 4C:
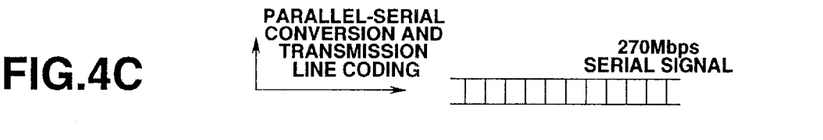

When data is to be transmitted from the output terminal 33 of FIG. 1 by using this SDDI format, the data is parallel-serial converted by the parallel/serial converting section 29 and then outputted from the output terminal 33 as a serial signal having a data transfer rate of 270 Mbps as shown in FIG. 4(c). Alternatively, the data is inputted as the serial signal shown in FIG. 4(c) from the input terminal 32 and then converted by the serial/parallel converting section 26 so as to have the format as shown in FIGS. 4(a) and 4(b).

FIG. 5 shows a specific configuration of the line format of the SDDI signal.

Figures 5A, 5B:
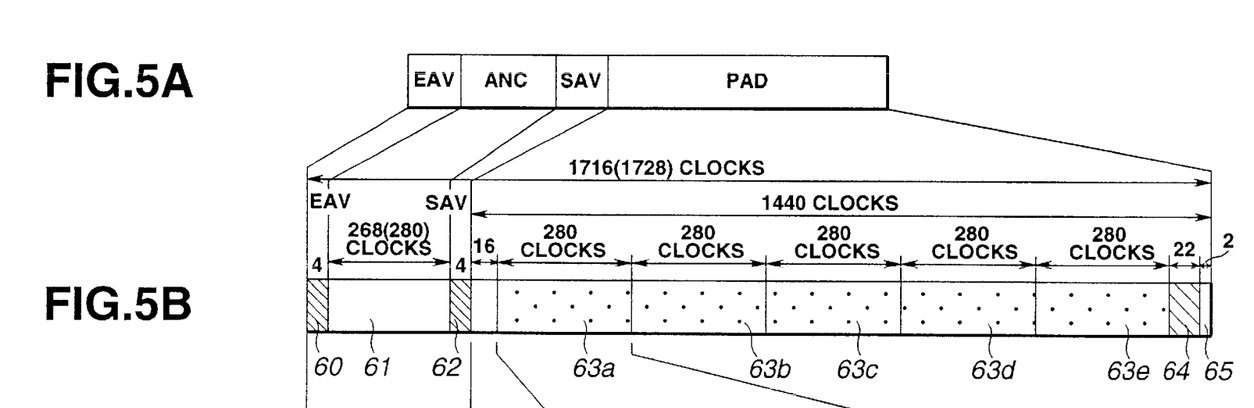
FIG. 5 is a view showing the configuration of a transmission unit of digital video data to be transmitted.
Figure 5C:
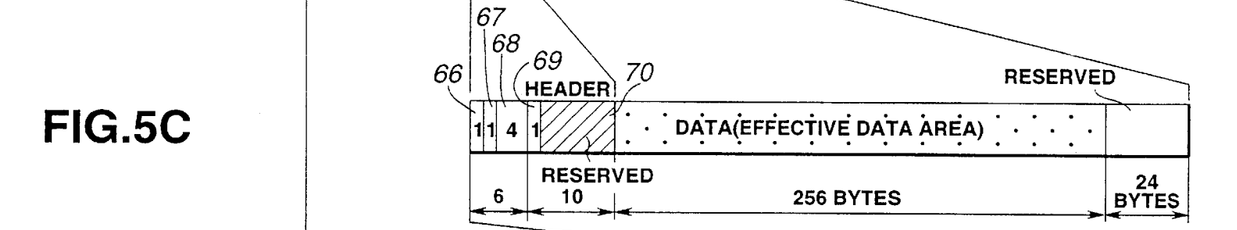
Figure 5D:
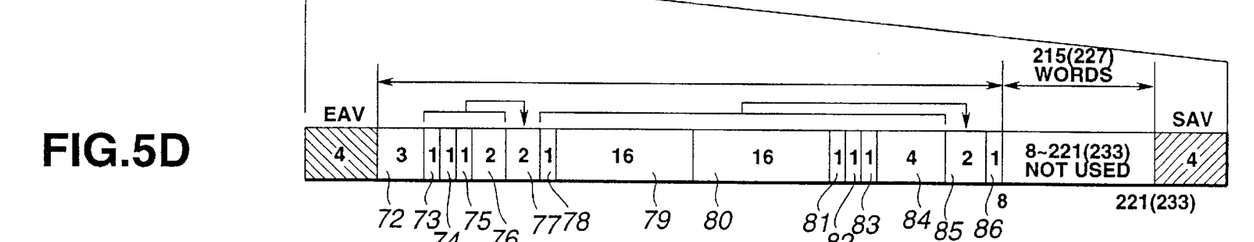

FIG. 5(a) shows the schematic configuration of the line format of FIG. 4(b). FIG. 5(b) shows the more detailed schematic configuration of the line format shown in FIG. 5(a). FIG. 5(c) shows the detailed configuration of the payload portion PAD. FIG. 5(d) shows the detailed configuration of the ancillary data portion ANC.

The line format is constituted as a whole by an EAV (end active video, i.e., end synchronizing code) area 60 of four words, an auxiliary signal area (ancillary data portion) 61 of 268 words, a SAV (start active video, i.e., start synchronizing code) area 62 of four words, a header area of 16 words, five divided effective data areas 63a, 63b, 63c, 63d, 63e, a reserved area 64 of 22 words, and a CRC area 65 of two words, as shown in detail in FIG. 5(b). The header area of 16 words of the payload area is constituted by a data header area of six words and an interface area of 10 words.

As described above, the four-word end synchronizing code is inserted in the EAV area 60, and the start synchronizing code is inserted in the SAV area 62. Between the EAV area 60 and the SAV area 62, the auxiliary signal area 61 shown in detail in FIG. 5(d) is provided. The auxiliary signal area 61 will be later described in detail. In the SAV 62 and the EAV 60, words of hexadecimal codes of (3FF, 000, 000 XYZ)h are inserted. The auxiliary signal area 61 includes 268 words in the case of 525 scanning line/60 fields, and 280 words in the case of 625 scanning lines/50 fields.

The SAV area 62 is followed by the payload area of 1440 words as a whole. The payload area is constituted by the header area including the data header area of six words and the interface area of 10 words, the areas 63a, 63b, 63c, 63d, 63e in which five video data are inserted on the basis of 280 words as a unit, the reserved area 64 of 22 words, and the CRC area of two words.

The data header area of six words includes, from the leading part thereof, a separator 66 in which a start code is inserted, a type 67 indicating the type of video data to be inserted, and a word count 68 indicating the number of words of the effective data area as later described. The line where data is actually inserted is the 8th horizontal period (8th line) in the case of the 525 scanning lines/60 fields system, and the 12th horizontal period (12th line) in the case of the 625 scanning lines/50 fields system. (The "Start Code" shown on the upper left side in FIG. 7 corresponds to this line.)

The interface header area of 10 words includes an information area 69 of one word indicating the data transfer speed, and a reserved area 70 of nine words. In the reserved area 70, status information of a connected equipment (such as, a VTR) to which data is transmitted by the SDDI format may be written.

The header area of 16 words is followed by the five data areas 63a, 63b, 63c, 63d and 63e, each including 280 words. Video data may be actually inserted in these areas. In this embodiment, compressed data is inserted. Specifically, as described with reference to FIG. 2, compressed data of 256 words per line is inserted in, for example, the data area 63a of the data areas 63a to 63e, and then 24-word reserved data is inserted to constitute the data area 63a of 280 words. This data area is described in detail with reference to FIG. 7.

The five data areas, each having 280 words, are followed by the 22-word reserved area 64 and then the two-word CRC area 65. The CRC area 65 includes two areas of a CRCC (cyclic redundancy check code) 0 area and a CRCC1 area. The two CRCCs are codes for checking transmission errors, and are remainders obtained by dividing data to be transmitted by a predetermined generating polynomial. These codes are inserted in the CRCC areas on the transmitting side, and similar division is carried out and the codes are compared with the transmitted remainder on the receiving side, thus checking transmission errors.

The payload area includes 1440 words, and the area formed by combining the EAV area 60, the auxiliary signal area 61 and the SAV area 62 includes 276 words, as shown in FIG. 5(b). Therefore, one line includes 1716 words as a whole. In the case of 625 scanning lines/50 fields, one line includes 1728 words.

FIG. 5(d) shows the configuration of the above-described auxiliary signal area 61.

The auxiliary signal area 61 includes an ancillary data flag 72, a data ID 73, a block number 74, a data count 75, a line number 76, a line number CRCC 77, a code (01h) 78, a destination address 79, a source address 80, a block type (C1h) 81, a CRC flag 82, a data extension flag 83, a reserved area 84, a header CRCC 85, and a check sum 86.

The ancillary data flag 72 is a code of three words sequentially including (000, 3FF, 3FF). The data ID 73 includes one word, indicating the type of data. The block number 74 includes one word in which a predetermined hexadecimal code for confirming continuity of a data packet is inserted. The data count 75 includes one word in which a code indicating the number of data of the auxiliary signal area 61 is inserted. The line number 76 includes two words indicating the horizontal line number, in which values from 1 to 525 in the case of the 525 scanning lines/60 fields system or values from 1 to 625 in the case of the 625 scanning lines/50 fields are inserted. By inserting the line number in this area, line-based data transmission may be carried out, thus enabling line-based switching at the destination of transmission. Also, by appending the line number, quick synchronization with the frame may be carried out at the destination of transmission. In the line number CRCC 77, a CRCC code for checking transmission errors of five words from the data ID 73 to the line number 76 is inserted. The code 78 mainly indicates the effective data length of the auxiliary signal area 61 and the format of the destination and source addresses 79, 80. The format of the address indicates whether the address code is expressed by a predetermined code or an undetermined special code. The destination address 79 indicates the address of the destination of data, and the source address 80 indicates the address of the sender of data. Each of the destination address and the source address includes 16 words. The block type 81 includes one word, identifying the format of the auxiliary signal area 61. The CRC flag 82 includes one word in which a code indicating the presence or absence of the CRC area 64 at the end of the payload area is inserted. The data extension flag 83 includes one word, indicating whether or not extended user data exists in the auxiliary signal area 61. For example, when data that should be inserted in the payload area is also inserted in the auxiliary signal area 61, a flag is raised in the data extension flag area 83. The reserved area 84, including four words, is utilized for indicating some other data or codes. The header CRCC 85 indicates a code for checking transmission errors of data from the code 78 to the reserved area 84. The check sum 86 is an area used for confirming data that should be inserted in the auxiliary signal area 61. An area subsequent to this check sum area 86 up to the SAV area 62 is not used.

Numerals in FIG. 5 represent data quantities (words) in the case of the 525 scanning lines/60 fields system, and numerals in parentheses represent data quantities in the case of the 625 scanning lines/50 fields system.

Figure 6:
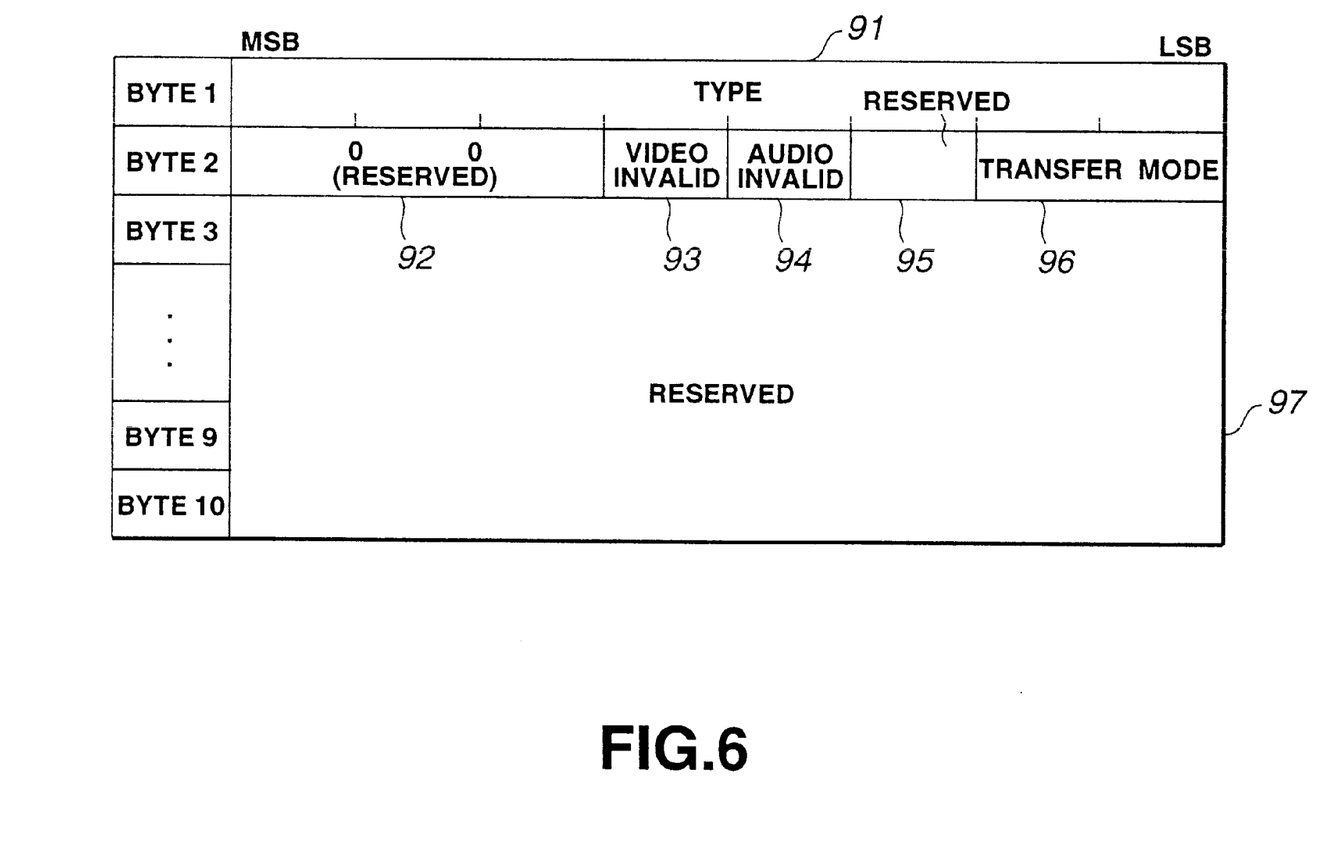
FIG. 6 is a view showing the configuration of a header portion of the digital video data.

FIG. 6 shows the bit layout of the interface header area. Byte 1 and Byte 2 are areas for recording information proper to this interface. Byte 3 to Byte 10 are reserved areas for recording information related to the standard of digital VTR in conformity to such format.

TYPE 91 indicates the contents of the interface header area and the payload area. Specifically, either value of "0000 0000" and "0000 0001" is used. The former indicates the initial code, and the latter is used for defining the data transfer speed or allocation of five slots of the payload area.

A reserved area 92 has "00" and is not used.

VIDEO INVALID 93 is information indicating the effectiveness of video data in the payload area. 0 is allocated when the video data is effective, while 1 is allocated when the video data is ineffective.

AUDIO INVALID 94 is information indicating the effectiveness of audio data in the payload area. 0 is allocated when the audio data is effective, while 1 is allocated when the audio data is ineffective.

A reserved area 95 is not used.

TRANSFER MODE 96 uses values of 000 to 111 so as to allocate the effectiveness and transfer speed of the data of the payload area.

Figure 7:
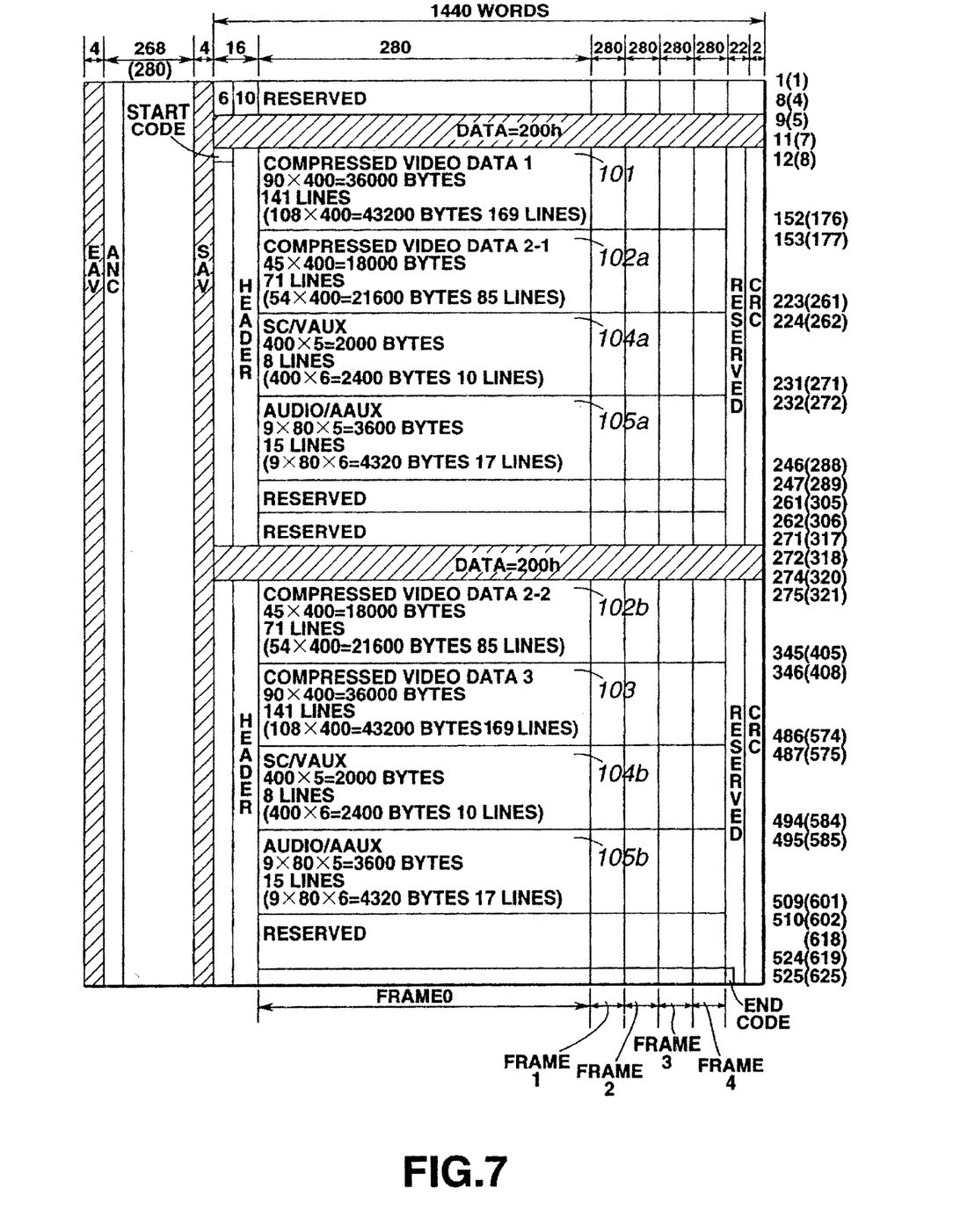
FIG. 7 is a view showing the format of data to be transferred between the data editing device and an external equipment.

FIG. 7 shows, in details, the format of the data transmitted between the above-described data editing device 100 and an external equipment, not shown, that is, the data that should be inserted in each area shown in FIG. 4(*a*). The exemplary format shown in FIG. 7 is a format of a signal which has been transmitted or a signal which is to be reproduced and transmitted so that one frame of video data is trisected and recorded on three disk drives. That is, the format of FIG. 7 corresponds FIG. 2(*a*). As described above, FIG. 2(*a*) shows one frame of compressed video data as a whole, in which the data is divided into the video data 41, 42*a*, 42*b* and 43 with 256 bytes in the line direction. For example, when the data is actually recorded on each disk drive with the data layout shown in FIG. 2(*a*) and then reproduced and transmitted, the data layout shown in FIG. 2(*a*) as a whole is provided again by the serial/parallel converting section 26 of FIG. 1. These data are laid out to be inserted into the data areas of the payload area shown in FIG. 5, that is, the video data 41 of FIG. 2(*a*) into a compressed video data 101 of FIG. 7, the video data 42*a* of FIG. 2(*a*) into a compressed video data 102*a* of FIG. 7, the video data 42*b* of FIG. 2(*a*) into a compressed video data 102*b* of FIG. 7, and the video data 43 of FIG. 2(*a*) into a compressed video data 103 of FIG. 7. Similarly, with respect to FIG. 2(*b*), even when the video data is divided into the video data 41, 42*a*, 42*b* and 43, the video data are laid out in the compressed video data 101, 102*a*, 102*b* and 103 of FIG. 7. The internal transfer format at the time when the data is reproduced from the disk drive and transferred on the data bus 30 or until the data transferred in accordance with the format shown in FIG. 7 (and the format shown in FIGS. 4 and 5) is recorded on the disk drive is in conformity to the format shown in FIG. 8, which will be described later. Although five channels of data from frame 0 to frame 4 may be transferred, FIG. 7 shows only the layout of data of frame 0. The same data layout is provided also for frames 1 to 4.

As described above, the compressed video data is divided and laid out into the compressed video data 101, 102*a*, 102*b* and 103.

The audio data, too, is laid out in an audio/AAUX 105 with a configuration similar to those of the compressed video data 101, 102*a*, 102*b* and 103. Such separate layouts of the video data and the audio data are very effective for carrying out separate editing of the video data and the audio data by the data editing device 100 or a connected equipment conforming to the transfer format. Specifically, when the audio data together with the video data are superimposed on the compressed video data 101, 102*a*, 102*b* and 103, it is necessary at the transfer destination (the data editing device 100 or the connected equipment) to first separate the video data and the audio data and then carry out separate editing. However, by separately laying out the video data and the audio data as shown in FIG. 7, separation of the data is not necessary and the hardware equipment is reduced accordingly.

AAUX is auxiliary data of the audio data, such as, data of the sampling frequency and the number of quantization bits of the audio data.

In SC/AUX 104*a* and 104*b*, subcode data and other auxiliary data thereof are inserted, such as, data of time information including the recording time of video and audio data, and a time code.

In addition, plural reserved areas 106 are free areas used for inserting other data, such as, audio data other than the audio data to be inserted in audio/AAUX 105*a* and 105*b*.

The format of the data laid out in the SC/AUX 104*a* and 104*b* and the format of the data laid out in the audio/AAUX 105*a* and 105*b* are the same as the format of the data laid out in the compressed video data 101, 102*a*, 102*b* and 103, that is, the format shown in FIG. 5(*c*).

Numerals shown at the right end of FIG. 7 represent the numbers of lines in the case of 525 scanning lines/60 fields, and numerals in parentheses represent the numbers of lines in the case of 625 scanning lines/50 fields.

In transferring data with this format, only an arbitrary frame of the frames 0 to 4 may be used, or all the five frames may be used for transferring data of five systems which are different from one another. In the bit layout of the interface header area shown in FIG. 5, the transfer speed may be designated by TRANSFER MODE 96 of Byte 2. Specifically, by using plural frames for transferring a signal of a single system, the apparent transfer speed may be designated in five stages, that is, a normal speed, a double speed, a triple speed, a quadruple speed and a quintuple speed. For example, when a signal of a single system is transferred by using two frames, a double transfer speed may be obtained.

Inside of the data editing device of FIG. 1, it is assumed that video data compressed to approximately ⅕ is transferred and the apparent transfer speed may be increased to a quintuple speed at the maximum. Normally, the internal transfer speed is controlled in accordance with the data transfer speed of a digital VTR or the like which is connected with the data editing device and used for recording or reproducing material data. For example, in the case where a digital VTR capable of transferring data at a quadruple speed is used, the video data may be transferred on the data bus substantially at the quadruple speed by using four frames of the frames 0 to 3. According to such digital data transmission method, the video data and the audio data may be synchronized with each other and these data as a whole may be synchronized with other video data while the quadruple transfer speed is obtained. Therefore, editing points may be easily matched.

Figure 8:
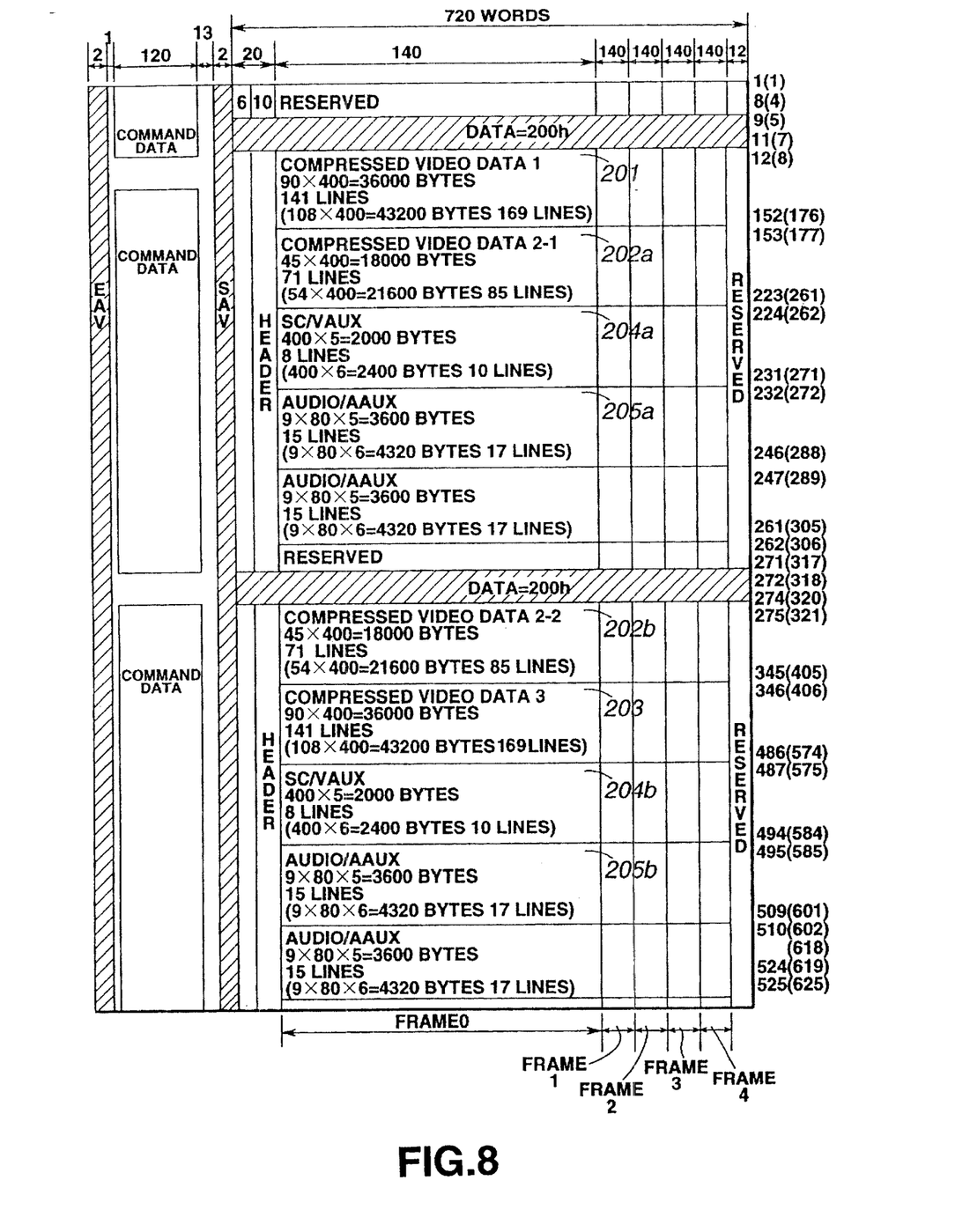
FIG. 8 is a view showing the format of data to be internally transferred within the data editing device.

FIG. 8 shows the format of data at the time when the data is transferred on the data bus 30 in the data editing device 100 shown in FIG. 1. This transfer format on the data bus 30 in the data editing device is compatible with the transfer format between the data editing device 100 and the external equipment, not shown, of FIG. 7, the SDDI format shown in FIG. 4, and the format of the data transferred with the data layout shown in FIGS. 5 and 6.

Specifically, data having each line of the format as shown in FIG. 5(b) transferred in a serial format is inputted via the input terminal 32, and converted to a parallel format by the serial/parallel converting section 26, thus obtaining the format as shown in FIG. 5(b). The entire frame has the data layout as shown in FIG. 7. The serial/parallel converting section 26 reads out the auxiliary signal area (ancillary data portion) and erases the auxiliary signal area after carrying out predetermined processing. The data in conformity to FIG. 7 as the entire frame is further converted by serial/parallel conversion. In this embodiment, the transfer format of the data transferred from the external equipment, not shown, is a serial transfer format in which one word has an eight-bit width. However, since the data is transferred on the data bus 30 by parallel transfer in which one word has a 16-bit width, the serial/parallel converting section 26 carries out serial/parallel conversion. Similarly, the parallel/serial converting section 29 converts the parallel format in which one word has a 16-bit width to the serial format in which one word has an eight-bit width.

The converted data is buffered in the buffer 11, and a transfer control command from the data transfer controller 22 is inputted via the data bus 30. The inputted transfer control command is laid out in a command data area 210 shown in FIG. 8, and the entire frame having a data layout shown in FIG. 8 is transferred to each disk drive or the switcher/multi-effector 13. The transfer control command outputted from the data transfer controller 22 will be described later with reference to FIG. 9.

The configuration of the format shown in FIG. 8 will now be described. Although this format enables transfer of data of five channels of frames 0 to 4, only the data layout of the frame 0 is shown. The same data layout as the frame 0 is provided also for the frames 1 to 4.

The compressed video data is divided and laid out into compressed video data 1 201, compressed video data 2-1 202a, compressed video data 2-2 202b, and compressed video data 3 203. This method of dividing and laying out the data is similar to the divided layout shown in FIG. 7. Specifically, the video data 41 shown in FIGS. 2(a) and 2(b) is laid out in the compressed video data 1 201, the video data 42a shown in FIGS. 2(a) and 2(b) is laid out in the compressed video data 2-1 202a, the video data 42b shown in FIGS. 2(a) and 2(b) is laid out in the compressed video data 2-1 202b, and the video data 43 shown in FIGS. 2(a) and 2(b) is laid out in the compressed video data 3 203 shown in FIG. 8.

The data layouts of FIGS. 7 and 8 differ in the following points. In FIG. 8, the data is transferred by parallel transfer with one word having a 16-bit width. On the other hand, in FIG. 7, the data is transferred by serial transfer with one word having an eight-bit width, and a command data area 110 for a transfer control command as later described is provided before the data area. The command data area 110 includes 120 words.

FIG. 9 shows the format for transferring plural channels of video and audio data and data including the above-described transfer control command between the various sections connected to the data bus 30, in accordance with the format of FIG. 8 within the data editing device of FIG. 1.

Figure 9A:
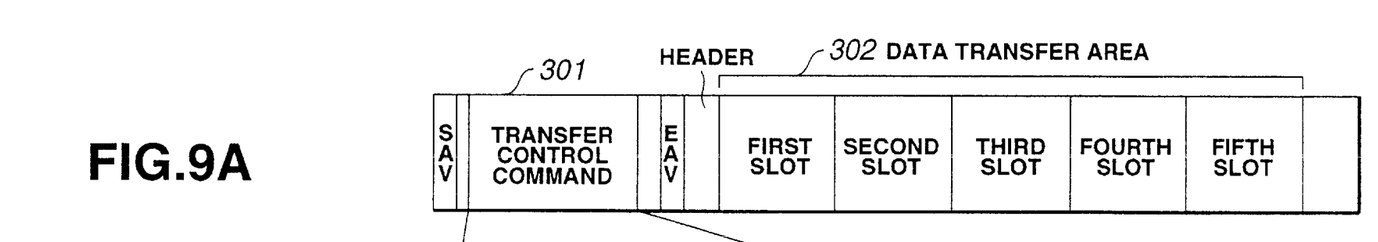
FIG. 9 is a view for illustrating the configuration of a data transfer control command inside of the data editing device.

That is, FIG. 9 is a view schematically showing each horizontal line of one frame of data of FIG. 8. In consideration of the configuration of FIG. 8, the transfer control command inserted in the command area 110 of FIG. 8 is inserted in a transfer control command area 301 of FIG. 9(a) The compressed video data 201, 202a, 202b and 203, the SC/VAUX data 204, the audio/AAUX data 205 and the RESERVED data, inserted in the frame 0, are inserted in a first slot of a data transfer area of FIG. 9(a). The data inserted in the frame 1 is inserted in a second slot of FIG. 9(a). The data inserted in the frame 2 is inserted in a third slot of the data transfer area 302 of FIG. 9(a). The data inserted in the frame 3 is inserted in a fourth slot of the data transfer area 302 of FIG. 9(a). The data inserted in the frame 4 is inserted in a fifth slot of the data transfer area of FIG. 9(a).

Figure 9B:
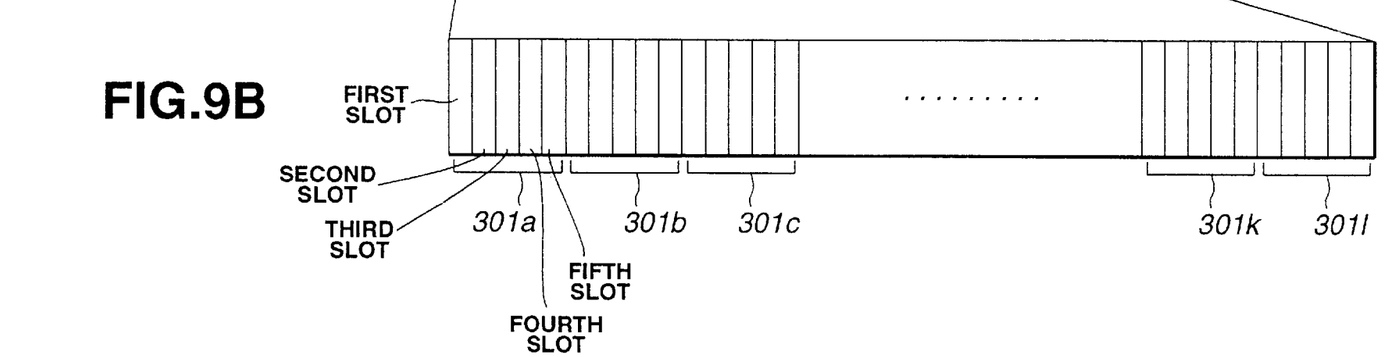

FIG. 9(b) shows, in detail, the transfer control command area 301 of FIG. 9(a). The transfer control command area 301 is divided into blocks 301a, 301b, . . . 301l for each command corresponding to each buffer, and each block is divided to correspond to each slot of the data transfer area 302. In the example shown in FIG. 9, the data corresponding to the first slot of the data transfer area 302 is inserted in a first slot of the transfer control command which is located on the left end in FIG. 9(b), and the data corresponding to the second slot of the data transfer area 3002 is inserted in a second slot of the transfer control command. The subsequent data are similarly inserted. It suffices that each of the frames 0 to 4 shown in FIG. 8 is inserted every line in each slot of the data transfer area 302 shown in FIG. 9(a), and the compressed video data 1 201 of FIG. 8 may be inserted in the second slot of the data transfer area 302 shown in FIG. 9.

On the basis of the data transfer format shown in FIG. 9, input/output of data is carried out on the data bus 30. Therefore, the compressed video data, video data additional information (VAUX), audio data, audio additional information (AAUX), and subcode information (SC) are transferred to each component part which is connected to the data bus 30 via the buffer.

The data bus 30 shown in FIG. 1 is a bus of synchronous transfer system and is adapted for carrying out transfer operation synchronized with reference video data. Specifically, the data transfer operation on the data bus 30 is controlled by the data transfer controller 22, every one horizontal period (every one line) of the reference video data. That is, the data transfer controller 22 generates a transfer control command, and each section connected to the data bus 30 uses a time slot designated by the transfer control command and receives a transfer control command indicating the transfer destination, the transfer source, and the start and end of transfer so that actual data is transferred in accordance with the transfer format shown in FIG. 9.

An example of transfer operation will now be described, in which data inputted from the input terminal 32 of FIG. 1 is inputted in accordance with the transfer format of the SDDI format shown in FIGS. 4 and 5, transferred onto the data bus 30 in accordance with the transfer format shown in FIGS. 8 and 9, and recorded on the disk drive.

The data, inputted to the input terminal 32 in a serial format data array, is converted to a parallel format by the serial/parallel converting section 26 so as to have a format as shown in FIG. 4(b) or FIG. 5(c). The configuration of the entire frame is shown in FIG. 4(a) or FIG. 7. The serial/parallel converting section 26 further reads out the auxiliary signal (ancillary portion) shown in FIG. 5(d), carries out predetermined processing, and then erases this auxiliary signal area. The data of the payload area is bit-converted by the gate circuit 27 from an eight-bit width to a 16-bit with for one word as described above, and then transferred to the buffer 11. The transfer control command is outputted from the data transfer controller 22 every one horizontal period (every one line), and the transfer control command is inserted in the data buffered in the buffer 11, with each line having the format shown in FIG. 9 and with each frame having the format shown in FIG. 8, so as to be transferred from the buffer 11 to the data bus 30. In this case, since the inputted data is intended to be recorded on the disk drive, the control command thereof becomes the transfer control command. Specifically, the buffered data is the data inserted in the compressed video data 201 of FIG. 8. The transfer control command at the time of recording the data onto the disk drive 18a is a transfer control command that should be inserted in the first slot of the data transfer area 203 in FIG. 9(a) since the data has the data layout of the compressed video data 1 201 of FIG. 8, and this transfer control command is also a transfer control command raising a flag in the first slot of the block 301G indicating the buffer 7 of FIG. 9(b) (on the assumption that the position of the command for the buffer 7 is 301G) since the disk drive 18a is connected to the data bus 30 via the buffer 7. Thus, by indicating the address of each buffer to correspond to each block of the transfer control command and raising a flat in the slot partitioned within each block, where the buffered data should be transferred and where the data inserted in which slot should be transferred may be expressed by the transfer control command. The data is buffered in the buffer 11, and such transfer control command is transferred from the data transfer controller 22 and transferred to the buffer 7 in accordance with the transfer format shown in FIG. 9(a). The data transferred to the buffer 7 is inserted in the data transfer area via the SPC 19a and transferred and recorded onto the disk drive 18a.

On the other hand, when the data recorded on the disk drive 18a is intended to be outputted from the output terminal 33, the data outputted via the SPC 19a is buffered in the buffer 7, and a transfer control command is inputted to the buffer 7 from the data transfer controller 22. This transfer control command is a transfer control command raising a flag in a block indicating the position of the buffer 12, that is, the position of 301l, since the buffer 12 has the output terminal 33 connected to the data bus 30. For example, with the data to be laid out in the frame 2 of FIG. 8, since the corresponding position in the data transfer area 302 is the third slot area, a flag is raised in the third position from the left within the block 301l. The transfer control command thus expressed is transferred, and then the data is transferred from the buffer 7 to the buffer 12 with the data transfer format shown in FIG. 9(a). The buffer 12 erases the transfer control command, and the data is bit-converted by the gate circuit 28 and converted to the transfer format shown in FIG. 5(c) by appending a predetermined auxiliary signal by the parallel/serial converting section. Then, the data is outputted from the output terminal 33.

Therefore, the serial/parallel converting section 26 and the parallel/serial converting section 29 have the function to carry out format conversion between the transfer format shown in FIGS. 4 and 5 and the internal transfer format shown in FIG. 9.

Each buffer shown in FIG. 1 is a memory of a two-bank structure which enables transmission by one bank during receiving by the other bank.

The contents of the above-described transfer control command include setting of transmission/receiving/No Operation of data and switch information of the memory bank. For example, when data is outputted to the data bus 30 at a quadruple speed, a command expressed to carry out transmission may be sent to the first to fourth slots, and a command expressing No Operation may be sent to the fifth slot.

In the above-described embodiment, the data is transferred unidirectionally by using the five channels of the frames 0 to 4. However, using the frames 0 and 1 for input and the frames 2 to 4 for output, data input/output may be carried out while data transfer is carried out between the editing device of FIG. 1 and an external equipment, not shown.

Also, in the above-described embodiment, the switcher/digital multi-effector 13 is employed as the device for processing the data outputted from the video data expanding sections 12a, 12b and outputting the processed data to the video data compressing section 14. However, other device, such as, a digital VTR, may be used.

In addition, in the above-described embodiment, the audio mixer 16 is employed as the device for processing the audio data outputted from the audio data output process sections 15a, 15b and inputting the processed data to the audio data input process section 17. However, other audio effect devices may be used.

According to the present invention, since data transfer within the editing device is carried out at the timing of the data, synchronous processing of the editing device as a whole may be facilitated. Also, by providing the interface with the external equipment at the same timing as the internal data and with the same data array as the internal data, synchronous processing between the external interface and the internal processing system may be easily realized without using any special hardware. In addition, since the same data array is used even at the time of multiple-speed transfer, system control may be facilitated.

What is claimed is:

1. An editing device comprising:

a format converting section for converting input data to internal transfer data;

an internal bus to which the data outputted from the format converting section is transferred; and a data transfer control section for performing control to plurally divide a transmission unit having a length equal to a predetermined period prescribed by an analog signal, lay out the input data in each of divided areas, and transfer the transmission unit as the internal transfer data onto the internal bus in synchronization with the input data;

whereby said input data includes frames of video data, said internal transfer data includes converted video frame data, and said converted video frame data is partitioned and transferred to a plurality of recording media such that said converted video frame data of any one of said frames is distributed amongst said plurality of said recording media such that gathering all of the data corresponding to any one of said frames involves accessing a multiple of said recording media.

2. The editing device as claimed in claim 1, further comprising a data processing section connected to the internal bus, the data processing section processing the data transferred on the internal bus so as to record or reproduce the data onto or from a recording medium.

3. The editing device as claimed in claim 1, further comprising an output format converting section for converting the internal transfer data so as to output the converted internal transfer data as output data, wherein the data transfer control section performs control to relocate the internal transfer data laid out in each of the divided areas to a length equal to a predetermined period, and output the output data from the output format converting section in synchronization with the internal transfer data.

4. The editing device as claimed in claim 3, wherein the output format converting section inserts the same data including a video signal inserted in each of the divided areas into the plural areas, and transfers the data at a multiple speed.

5. The editing device as claimed in claim 1, wherein the input data is data including a video signal and wherein the predetermined period is a period equal to a period forming one horizontal line of an image prescribed by a predetermined analog video signal standard, the transmission unit being transferred onto the internal bus in synchronization with a horizontal synchronizing signal or a vertical synchronizing signal of the input video signal.

6. The editing device as claimed in claim 5, wherein the input data including the video signal is equally divided in a vertical direction of an image and wherein the transmission unit having a length equal to the predetermined period is divided into plural areas with respect to each of the equally divided data so that the input data is laid out in each of the divided areas.

7. A data transmission method comprising:

a first step of plurally dividing a transmission unit having a length equal to a predetermined period prescribed by an analog signal;

a second step of laying out input data in each area divided at the first step and outputting the transmission unit as internal transfer data in synchronization with the input data; and a third step of transferring the internal transfer data outputted at the second step to an internal bus;

whereby said input data includes frames of video data, said internal transfer data includes converted video frame data, and said converted video frame data is partitioned and transferred to a plurality of recording media such that said converted video frame data of any one of said frames is distributed amongst said plurality of said recording media such that gathering all of the data corresponding to any one of said frames involves accessing a multiple of said recording media.

8. The data transmission method as claimed in claim 7, wherein the internal.transfer data transferred on the internal bus at the third step is processed with predetermined data processing by a data processing section connected to the internal bus.

9. The data transmission method as claimed in claim 7, wherein the input data is data including a video signal and wherein the predetermined period is a period equal to a period forming one horizontal line of an image prescribed by a predetermined analog video signal standard, the transmission unit being transferred onto the internal bus or outputted as output data in synchronization with a horizontal synchronizing signal or a vertical synchronizing signal of the input video signal.

10. The data transmission method as claimed in claim 9, wherein the input data including the video signal is equally divided in a vertical direction of an image and wherein the transmission unit having a length equal to the predetermined period is divided into plural areas with respect to each of the equally divided data so th.at the input data is laid out in each of the divided areas.

11. The data transmission method as claimed in claim 7, further comprising a fourth step of converting the internal transfer data transferred on the internal bus at the third step so as to output the converted internal transfer data as output data, the fourth step being adapted for relocating the internal transfer data laid out in each of the areas divided at the second step to a length equal to a predetermined period, and outputting the output data in synchronization with the internal transfer data.

12. The data transmission method as claimed in claim 11, wherein the fourth step is adapted for inserting the same data including a video signal inserted in each of the divided areas into the plural areas, and transferring the data at a multiple speed.

* * * * *